(12) United States Patent
Inoue et al.

(10) Patent No.: US 7,854,542 B2
(45) Date of Patent: Dec. 21, 2010

(54) BATCH MIXER AND MIXING ROTOR USED IN THE SAME

(75) Inventors: Kimio Inoue, Kobe (JP); Norifumi Yamada, Takasago (JP); Katsunobu Hagiwara, Takasago (JP); Hiromi Nakano, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 1014 days.

(21) Appl. No.: 11/263,954

(22) Filed: Nov. 2, 2005

(65) Prior Publication Data
US 2006/0104154 A1 May 18, 2006

(30) Foreign Application Priority Data
Nov. 18, 2004 (JP) ............................... 2004-334848

(51) Int. Cl.
*B29B 7/18* (2006.01)
(52) U.S. Cl. ...................................... 366/97; 366/76.7
(58) Field of Classification Search ................ 366/76.7, 366/97–99, 84–86, 300, 321, 323, 147
See application file for complete search history.

(56) References Cited

U.S. PATENT DOCUMENTS

| | | | | |
|---|---|---|---|---|
| 1,498,986 | A * | 6/1924 | Banbury | 366/91 |
| 4,744,668 | A * | 5/1988 | Nortey | 366/76.7 |
| 4,834,543 | A * | 5/1989 | Nortey | 366/97 |
| 4,893,936 | A * | 1/1990 | Borzenski et al. | 366/76.7 |
| 5,791,776 | A * | 8/1998 | Takakura et al. | 366/84 |
| 5,984,516 | A | 11/1999 | Inoue et al. | |
| 6,402,360 | B1 * | 6/2002 | Nortey | 366/85 |
| 6,811,295 | B2 * | 11/2004 | Koro et al. | 366/97 |

(Continued)

FOREIGN PATENT DOCUMENTS

EP   1 033 217 A2   9/2000

(Continued)

OTHER PUBLICATIONS

N. I. Shikhirev, et al., "Influence of the gap between the wall of the mixing chamber and the top of the rotor blade of an internal mixer on the effectiveness of rubber mix formation", International Polymer Science and Technology, vol. 19, No. 2, XP-000276028, Jan. 1992, pp. T3-T5.

*Primary Examiner*—David L Sorkin
(74) *Attorney, Agent, or Firm*—Oblon, Spivak, McClelland, Maier & Neustadt, L.L.P.

(57) ABSTRACT

A plurality of mixing rotors that are housed in a chamber having a cocoon-shaped cross section in a tangential non-intermeshing state, where a plurality of long wings and short wings are provided on a wing portion of the mixing rotors. The long wings and the short wings severally have a plurality of different sizes of tip clearances, a twist angle of the long wings is changed in the axis direction, and makes mixing efficiency and dispersion efficiency compatible. Further, cooling medium paths are provided severally in the chamber and the mixing rotors to suppress excessive increase of the temperature of mixing materials. According to a batch mixer using the mixing rotors, it is possible to control quality reduction of the mixing materials caused by heat generation, and to improve the productivity by increasing the number of the wings without diminishing inherent processing performance of the mixer.

11 Claims, 6 Drawing Sheets

U.S. PATENT DOCUMENTS

| | | |
|---|---|---|
| 2001/0036123 A1 * | 11/2001 | Koro et al. ............ 366/84 |
| 2001/0050880 A1 * | 12/2001 | Regalia ............ 366/84 |
| 2002/0163852 A1 | 11/2002 | Valsamis et al. |
| 2004/0179424 A1 | 9/2004 | Yamada et al. |

FOREIGN PATENT DOCUMENTS

| | | |
|---|---|---|
| JP | 5-261725 | 10/1993 |
| JP | 11-48239 | 2/1999 |
| JP | 2000-246731 | 9/2000 |
| JP | 2002-11336 | 1/2002 |
| SU | 1109317 A | 8/1984 |

\* cited by examiner

BATCH MIXER AND MIXING ROTOR USED IN THE SAME

BACKGROUND OF THE INVENTION

1. Field of the Invention

The present invention relates to a batch mixer for mixing polymer resin materials such as plastic and rubber, and a mixing rotor used in the batch mixer

2. Description of the Prior Art

A batch mixer is designed to produce a mixed product for one batch with a series of actions where after mixing materials such as rubber and plastic are pressed into a chamber by a floating weight, the materials are mixed by a pair of mixing rotors provided in the chamber, and the mixing materials are discharged from the chamber to the outside via a drop door when the mixing materials reached a desired mixing state.

As this type of mixer, there are known a batch mixer (refer to U.S. Pat. No. 5,984,516 publication) which is capable of mixing various types of mixing materials without replacing mixing rotors and, at the same time, securing the quality of the mixing materials to be obtained without sacrificing inherent processing performance of the apparatus, a mixer (refer to European Patent No. 1033217 publication) where mixing and dispersion of the mixing materials processed by one mixing wing are effectively balanced and the mixing is properly controlled where both the mixing and the dispersion are compatible, and the like.

The mixing rotors shown in the U.S. Pat. No. 5,984,516 publication are used in a batch mixer, where two or more wing sections consisting of a long wing and a short wing are formed on each mixing rotor in the circumference direction, gaps (tip clearance) between wing top portions of the wing sections in the axis direction and the circumference direction and a chamber inner wall surface are changed in two or more of large, medium and small.

Reasons for varying the tip clearance of the wing sections of the mixing rotors are as follows. Specifically, the wing having a narrow tip clearance allows a major part of the mixing materials on the forward movement side of the tip clearance to move in the axis direction, impart strong shearing force to the mixing materials to promote the dispersion, and can improve a mastication effect of natural rubber. Further, by scraping off the surface layer of the mixing materials attached on the chamber inner wall surface, cooling efficiency by the chamber inner wall surface having a cooling structure can be increased, and excessive increase of temperature caused by strong shearing force can be suppressed.

On one hand, wings having a large tip clearance promote the movement of the mixing materials in the circumference direction by allowing a major part of the mixing materials on the forward movement side of the tip clearance to pass the clearance, mix the materials to apply an even shearing action to the mixing materials, and excessive increase of temperature of the mixed product can be suppressed even when the number of wings of the mixing rotors increases because the shearing force applied to the mixing materials by the wings is controlled at a low level.

On the other hand, the mixing rotors shown in the European Patent No.1033217 publication are used in a batch mixer and a continuous mixer. In the mixing rotors, the twist angle of the mixing wings, which are developed into a plane state around their axis center, varies from its origin to end-point to make a developed shape of the mixing wings from the origin to the end-point substantially become a non-linear shape. Thus, the flow of the mixing materials in the axis direction and the circumference direction is controlled, and a mixing effect and a dispersion effect can be compatible in a well-balanced manner.

In other words, a material flow of the mixing materials in the axis direction is generated to improve the mixing effect of the mixing materials by the origin portion of the mixing wing, which has a large twist angle, while the amount of the mixing materials passing though the tip clearance is secured at the end-point portion having a small twist angle, and thus the dispersion effect of the mixing materials can be improved.

However, in the constitution of the above-described prior art, when the number of wings is increased to three or more in order to increase the biting speed of the mixing materials into the chamber to improve the production efficiency, the temperature of the mixing materials increases and the mixing quality of a mixed product reduces due to the increase of heating value caused by shearing, the effective volume of the chamber reduces to decrease the production efficiency due to the increase of the volume proportion of the rotors within the chamber, and a shorter distance between adjacent mixing wings and an increased rotor surface area allow the mixing materials to attach to the surface of the mixing wings to reduce the mixing quality and the production efficiency.

Generally, the temperature increase of the mixing materials is suppressed by reducing the charge amount of the mixing materials into the chamber or reducing the rotation number of rotors, and similarly, the attaching of the mixing materials to the surface of the mixing wings is controlled by reducing the charge amount of the mixing materials into the chamber.

However, to make the improvement of the production efficiency compatible with maintaining/improving the mixing quality, sacrificing the inherent processing performance of the mixer, that is, reducing the rotation number of the mixing rotors or reducing the charge amount of the mixing materials is an unpractical countermeasure.

SUMMARY OF THE INVENTION

Therefore, it is an object of the present invention to provide a batch mixer and a mixing rotor used in the apparatus, which are capable of preventing the quality reduction of the mixing materials caused by heat generation and improving the productivity by increasing the number of wings without diminishing the inherent processing performance of the mixer.

To solve the above-described problems, the first invention is a batch mixer comprising: a case having a chamber for mixing therein; a pair of mixing rotors rotating in the opposite direction to each other, where the pair of mixing rotors are in a non-intermeshing state; and a cooling structure for cooling down the inner surface of the chamber, in which each of the pair of mixing rotors has a mixing section and is made up of: a long wing that has an origin at one end portion of the mixing section and extends further than the center of the mixing section in the rotation axis direction of the mixing rotor so as to twist backward in the rotation direction of the mixing rotor, where three or more of the long wings are disposed in the circumference direction of the mixing rotor; and a short wing that has an origin at the other end portion of the mixing section and extends to a position before the center of the mixing section in the rotation axis direction of the mixing rotor so as to twist backward in the rotation direction of the mixing rotor, where three or more of the short wings are disposed in the circumference direction of the mixing rotor. Herein, a narrow tip clearance and one or more of wider tip clearances are allowed to appear in the axis direction of three or more of the long wings, a twist angle at the one end portion of three or more of the long wings is 30° to 65°, three or more of the long wings are formed in a twisted curve whose twist angle becomes smaller as it draws apart from the one end portion, three or more of the short wings have a narrow clearance and one or more of wider clearances at least in the circumference direction in a mixed manner, and the long and short wings are disposed such that, when the mixing rotor is turned for one rotation, the short tip clearances pass over the total length in the axis direction of the mixing section for at least one time due to the presence of the narrow tip clearance of the long wing and the narrow tip clearance of the short wing.

(Countermeasure to Reduction of Volume Due to Increase of the Number of Wings)

With this configuration, by housing the pair of mixing rotors in the chamber in a tangential non-intermeshing state, the reduction of effective volume of the chamber associated with the increase of the number of wings is prevented as much as possible to improve the production efficiency. Although conventionally used intermeshing rotor type batch mixers have had high cooling performance to the mixing materials, its effective volume is smaller and the productivity is lower than tangential non-intermeshing rotor type. In the present invention, by improving the cooling performance with multiple countermeasures (described later), the production efficiency can be improved without reducing the mixing quality even when the tangential non-intermeshing rotor is employed.

(Improving Packing Ratio)

A narrow tip clearance and one or more of wider tip clearances are allowed to appear in the axis direction of the long wings, the short wings have a narrow clearance and one or more of wider clearances at least in the circumference direction in a mixed manner, the long wings are formed in a twisted curve whose twist angle becomes smaller as it draws apart from the one end portion, and thus, biting property of the mixing materials into the chamber improves.

Specifically, the different sizes (wide and narrow) of tip clearances allow the rotors to bite different sizes of mixing materials efficiently into the chamber, or alternatively, the mixing wings are formed such that the twist angle becomes smaller at the center of the chamber, and therefore priority is given more to the biting property of the mixing materials than the movement promotion of the mixing materials in the axis direction at the center of the chamber. Thus, mixing time is shortened, the packing ratio of the mixing materials into the chamber improves, and the productivity improves.

(Preventing Accumulation)

With the increase of the number of the mixing rotors, the distance between adjacent mixing wings is made shorter, the mixing materials easily attach to the surface of the mixing wings, and the mixing materials are easily accumulated. Consequently, by setting the twist angle at the one end portion of the long wings to 30° to 65°, the flow of the mixing materials in the mixing rotor axis direction, which has the origin at the one end portion of the chamber, is promoted, and it prevents the mixing materials from attaching to the surface of the mixing wings and from accumulating between the mixing wings.

(Improving Mixing Quality)

By setting the twist angle at the one end portion of the long wings to 30° to 65°, the flow of the mixing materials in the mixing rotor axis direction, which has the origin at the one end portion of the chamber, is promoted and mixing efficiency is improved, and on the other hand, by setting the twist angle of the long wings to a smaller value than the origin twist angle at the center of the chamber, priority is given more to the dispersion performance of the mixing materials than the movement property of the materials in the axis direction to improve the dispersion efficiency.

Further, a narrow tip clearance and one or more of wider tip clearances are allowed to appear in the axis direction of the long wings, the short wings have a narrow clearance and one or more of wider clearances at least in the circumference direction in a mixed manner, the flow of the mixing materials in the circumference direction is promoted to improve the mixing efficiency, and on the other hand, when the mixing rotor is turned for one rotation, the narrow tip clearance of the long wing and the narrow tip clearance of the short wing are allowed to pass over the total length in the axis direction of the mixing section for at least one time, by which the dispersion efficiency is improved.

Furthermore, by imparting various tip clearances and various twist angles to each mixing wing, the apparatus is designed to be capable of dealing with mixing materials of various properties, and also designed to be capable of mixing and dispersing the materials in good balance.

(Improving Cooling Efficiency)

With the increase of the number of wings, the heat generation caused by shearing between the mixing wings and the chamber inner wall surface increases on the entire apparatus basis. Since excessive increase of the temperature of the mixing materials deteriorates the mixing quality, such a temperature increase needs to be suppressed.

Consequently, when the mixing rotor is turned for one rotation, the narrow tip clearance of the long wing and the narrow tip clearance of the short wing are allowed to pass over the total length of the mixing section in the axis direction for at least one time. This made it possible to evenly scrape off the mixing materials attached to the chamber inner wall surface having cooling medium paths, and the cooling efficiency to the mixing materials in the chamber is improved.

In addition, by allowing the long wings and the short wings to include wide tip clearances, excessive heat generation of the mixing materials is suppressed.

Moreover, the movement property is improved by making the twist angle at the one end portion of the long wings larger, by which the attaching and the accumulation of the mixing materials to the surface of the mixing wings are prevented and the cooling efficiency is also improved.

With the above-described synergy effect, the quality reduction of the mixing materials caused by the heat generation is prevented, and the number of wings can be increased to improve the productivity without diminishing the inherent processing performance of the mixer.

The second invention is the batch mixer of the first invention, where the twist angle of the tip of the long wings that draw apart from the one end portion is 10° to 55°, and a twist angle at the other end portion of the short wings is 20° to 45° and is formed smaller than the twist angle of the long wings at the one end portion.

With this configuration, the biting property to the mixing materials is not deteriorated and excessive pressure generated by the flow of the mixing materials in the mixing rotor axis direction is controlled by setting the twist angle of the tip of the long wings that draw apart from the one end portion to 10° to 55°. Thus, the mixing materials can be prevented from flowing to a shaft sealing section at the other end portion. Furthermore, by setting the twist angle of the short wings at the other end portion to 20° to 45° and by forming the angle smaller than the twist angle of the long wings at the one end portion, the movement property of the mixing materials from the other end to the one end is promoted to prevent the accumulation of the mixing materials at the short wings as well, and the movement property of the mixing materials between the long wings and the short wings is secured. Consequently, by securing the biting property and the movement property of the mixing materials, the production efficiency and the mixing quality can be improved.

The third invention is the batch mixer of the first invention or the second invention, where the ratio of the narrow tip clearances to a chamber inner diameter is 0.005 to 0.025, and the ratio of the wide tip clearances is at least one of 0.01 to 0.05, 0.02 to 0.1, and 0.025 to 0.15.

With this configuration, different sizes of tip clearances appear over the total length of in the axis direction of the mixing section, the shearing force certainly works in the mixing materials to disperse the mixing materials, and the mixing materials can be mixed. Consequently, it is always possible to process various types of mixing materials into a mixed product of a desired mixing state, and the mixing quality can be improved.

The fourth invention is the batch mixer of the third invention, where the long wings are four or five pieces and include tip clearances having a ratio to the chamber inner diameter of 0.005 to 0.025, 0.01 to 0.05, 0.02 to 0.1, and 0.025 to 0.15 in the axis direction of each long wing, and the short wings are four or five pieces and each short wing in the circumference direction includes a tip clearance having the ratio at 0.005 to 0.025, 0.01 to 0.05, 0.02 to 0.1, and 0.025 to 0.15.

By setting the long wings and the short wings to four or five pieces, the dispersion property and the mixing property of the mixing materials improve, and the mixing quality also improves. Further, batch weight increases or mixing time is shortened depending on a mixing material, and the production efficiency improves. In addition, the cooling performance improves with the increase of the rotor surface area associated with the increase of the number of wings.

The fifth invention is the batch mixer of the fourth invention, where the numbers of the long wings and the short wings are the same, tip clearances of the same number as the number of the long wings are allowed to appear on each long wing, different tip clearances corresponding to the tip clearances in the axis direction are also allowed to appear on each wing in the circumference direction of the long wings, and different tip clearances of the same number as the number of the short wings are allowed to appear on each wing in the circumference direction.

With this configuration, a plurality of different tip clearances can be arranged in good balance in the axis direction and the circumference direction. Further, the long wings are formed in a twisted curve whose twist angle becomes smaller as it draws apart from the one end portion, and many mixing wing sections having different twist angles even on the same tip clearance appear. Therefore, the apparatus can deal with a wide range of mixing conditions while maintaining high productivity and mixing quality.

The sixth invention is the batch mixer of the fourth invention or the fifth invention, where the mixing rotors have paths for flowing a cooling medium in the inside of the rotors.

This can suppress excessive increase of temperature associated with the mixing of the mixing materials in the case of four or more mixing wings.

The seventh invention is the batch mixer of the sixth invention, where the cross section of the cooling medium paths is formed in a similar shape to the cross section of the mixing rotor.

Consequently, by making difference of distances from the cooling medium paths to the mixing rotor surface, that is, by making difference of rotor thickness smaller, the mixing materials can be evenly cooled down on the rotor surface.

The eighth invention is a mixing rotor having a mixing section, which is made up of: a long wing that has an origin at one end portion of the mixing section and extends further than the center of the mixing section in the rotation axis direction so as to twist backward in the rotation direction of the mixing rotor, where three or more of the long wings are disposed in the circumference direction of the mixing rotor; and a short wing that has an origin at the other end portion of the mixing section and extends to a position before the center of the mixing section in the rotation axis direction so as to twist backward in the rotation direction of the mixing rotor, where three or more of the short wings are disposed in the circumference direction of the mixing rotor. Herein, a high tip portion and one or more of lower tip portions are provided in the axis direction and the circumference direction of each of three or more of the long wings, three or more of the long wings are formed in a twisted curve whose twist angle becomes smaller as it draws apart from one end portion, and three or more of the short wings have a high tip portion and one or more of lower tip portions in a mixed manner at least in the circumference direction of the short wings.

The ninth invention is the mixing rotor of the eighth invention, in which the long and short wings are disposed such that, when the rotor is turned for one rotation, the high tip portions pass over the total length in the axis direction of the mixing section due to the presence of the high tip portion of the long wing and the high tip portion of the short wing.

The tenth invention is the mixing rotor of the ninth invention, in which the short wings are four or five pieces.

The dispersion property and the mixing property of the mixing materials improve and the mixing quality also improves by increasing the number of the mixing wings. Further, batch weight increases or mixing time is shortened depending on a mixing material, and the production efficiency improves.

The eleventh invention is the mixing rotor of the tenth invention, in which the rotor has paths for flowing a cooling medium in the inside.

This can suppress excessive increase of temperature associated with the mixing of the mixing materials.

The twelfth invention is the mixing rotor of the eleventh invention, in which the cross section of the cooling medium paths is formed in a similar shape to the cross section of the mixing rotor.

Consequently, by making difference of distances from the cooling medium paths to the mixing rotor surface, that is, making difference of rotor thickness smaller, the mixing materials can be evenly cooled down on the rotor surface.

DESCROPTION OF THE PREFERRED EMBODIMENTS

Description will be made for best modes to implement the present invention as follows based on FIG. 1 to FIG. 6.

Figure 3:
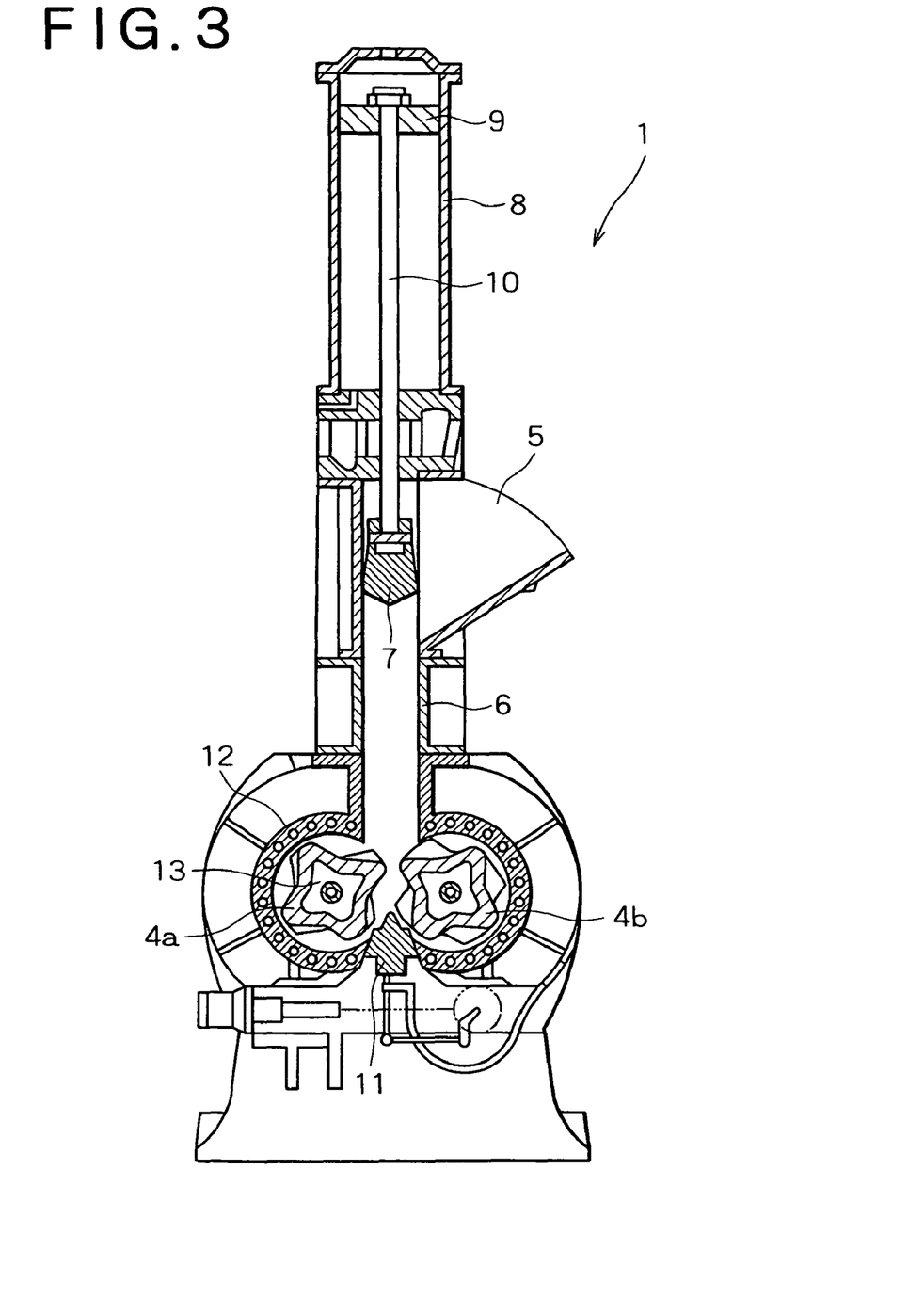
FIG. 3 is an overall view of the batch mixer.

Among the drawings, FIG. 3 shows a batch mixer of tangential non-intermeshing rotor type as an example of the batch mixer employing the mixing rotor of the present invention, and the batch mixer 1 includes a case 3 having a chamber 2 whose cross section is a cocoon shape (a shape where two circles are combined so as to partially superpose on each other) and which is provided with cooling medium paths 12, a pair (right and left) of first and second mixing rotors (4a, 4b) rotatably inserted in the chamber 2 in a non-intermeshing state, a material supply tube 6 with a hopper 5, which is provided on the upper opening of the chamber 2 in a standing manner, and a floating weight 7 inserted in the supply tube 6 movably in the vertical direction.

An air cylinder 8 is connected to the upper portion of the material supply tube 6, an a piston 9 inside the air cylinder 8 is connected to the floating weight 7 via a piston rod 10 that penetrates the lower lid of the air cylinder 8 in an air-tight state. For this reason, by pressurizing the upper portion of the air cylinder 8 to lower the floating weight 7, mixing materials in the material supply tube 6, which are supplied from the hopper 5, can be pushed into the chamber 2.

A discharge port provided at the bottom portion of the chamber 2 is closed by a drop door 11 that is movable in the vertical direction, and the mixing materials that have been mixed for a predetermined time in the chamber 2 can be discharged to the outside of the apparatus by opening the drop door 11.

Figure 1:
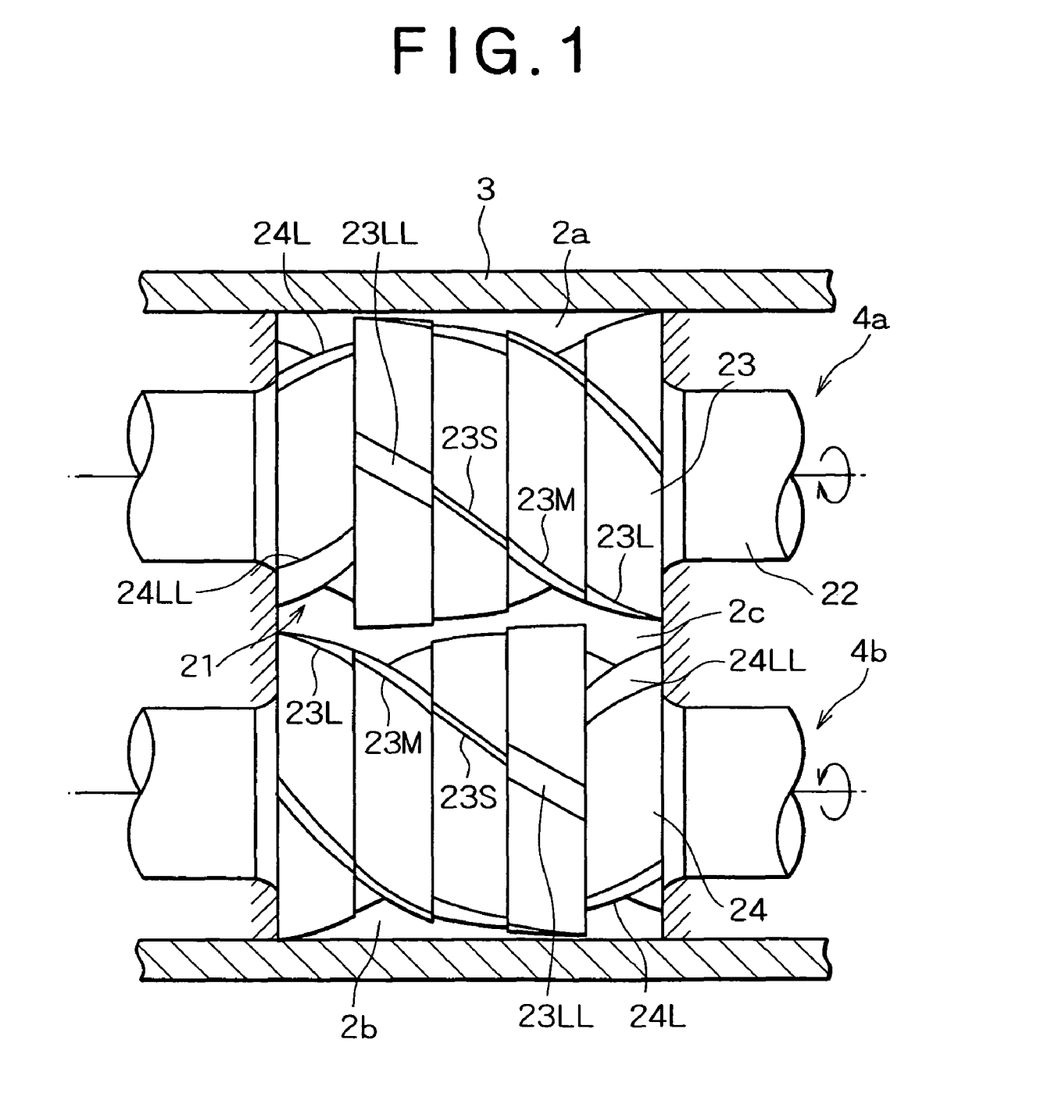
FIG. 1 is a top view of a mixing rotor in a chamber 2 of a batch mixer.

The cross section of the chamber 2 is in the cocoon shape so as to surround the mixing rotors 4 as shown in FIG. 3, the rotation ranges of the mixing rotors (4a, 4b) do not interfere to each other, tangential lines of facing points on their circumference lines are in close proximity to each other (hereinafter, referred to as tangential non-intermeshing), and thus a large effective volume of the chamber 2 is secured. Further, the chamber 2 includes a cooling structure having the cooling medium paths 12 that are disposed alternately in the axis direction (zigzag) along its periphery, and they suppress excessive increase of temperature during mixing and prevent deterioration of the mixing quality of the mixing materials. In the both axis directions of each mixing rotors (4a, 4b), end plates 20 are provided in a fitted manner perpendicular to the axes as shown in FIG. 1, and the plates rotatably support support sections 22 of the mixing rotors (4a, 4b).

The above-described mixing rotors (4a, 4b) have a mixing section 21 at the center in the axis direction and the support sections 22 on both ends, and formed in the same shape having a long wing 23 and a short wing 24 (described later) on the mixing section 21.

In the above-described mixing rotors (4a, 4b), their axis centers are parallel with each other, the rotors are in a tangential non-intermeshing state and disposed opposite to each other, the support sections 22 are inserted rotatably into the end plates 20 that are provided in the chamber in a fitted manner, and they are driven by a driving mechanism (not shown) to rotate in the different direction from each other such that their inner side portions move downward.

Figure 5:
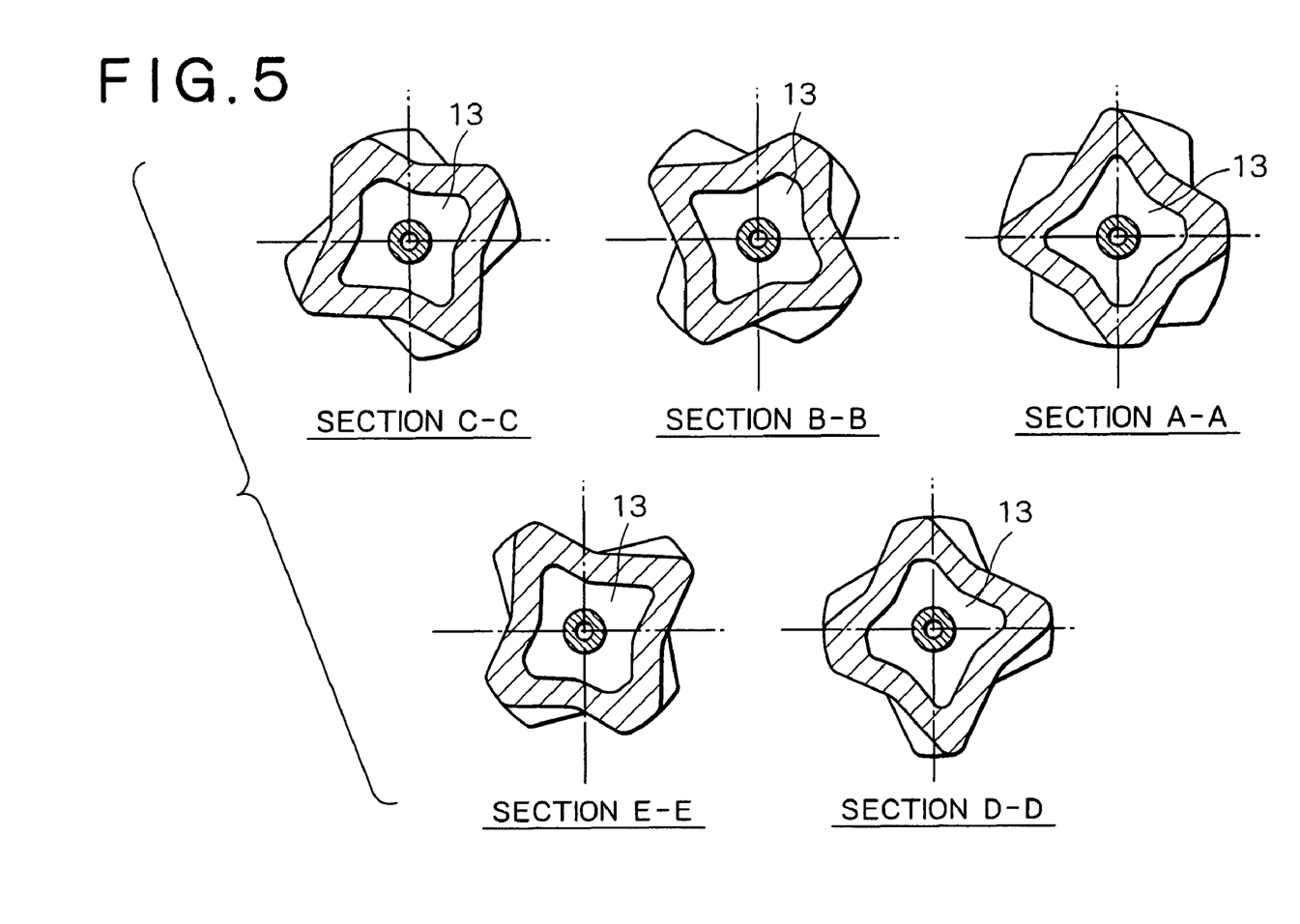
FIG. 5 is cross-sectional views of the mixing rotor.

Cooling medium paths 13, whose cross sections are shown in FIG. 5, are provided inside the mixing rotors (4a, 4b), and they suppress the temperature increase of the mixing materials associated with the increase of the mixing wings. The cross sections of the cooling medium paths 13 are approximately similar to the mixing wing surface, as shown in FIG. 5, a cooling medium supplied from a pipe, which is provided, at the center of the cooling medium paths 13, is allowed to flow in the mixing rotor axis direction along the cooling medium paths 13. Thus, the cooling medium can cool down the mixing materials evenly via the mixing wing surface.

In the mixing section 21, four pieces of the long wings 23 and four pieces of the short wings 24 to form tip clearances with the inner wall surface of the chamber 2, are provided in an extended manner in the rotor axis direction in order to impart the shearing force to the mixing materials and to disperse the material.

Figure 2:
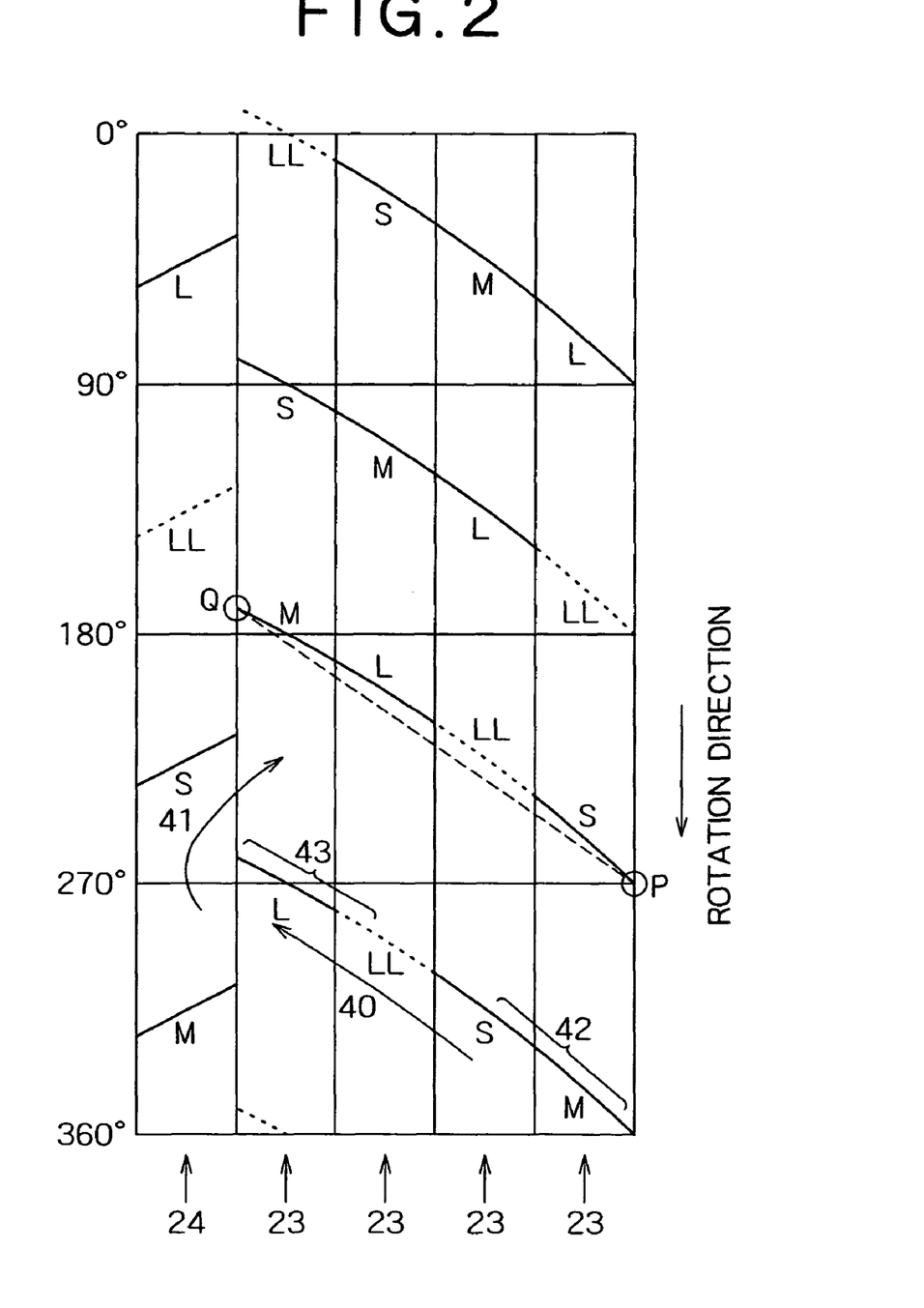
FIG. 2 is a development view of the mixing rotor.

The long wing 23 and the short wing 24, as shown in FIG. 2, are segmented in the axis direction and provided at positions shifted in the circumference direction in a protruded manner, and their twisting directions are opposite to each other in order to generate movement (40, 41) in the mixing materials and promote mixture in the mixing materials. Specifically, the long wing 23 has an origin at one end portion of the mixing section 21 and extends further than the center of the mixing section 21 so as to twist backward in the rotation direction, and on the other hand, the short wing 24 has an origin at the other end portion of the mixing section 21 and extends to a position before the center of the mixing section 21 so as to twist backward in the rotation direction. As described, since both the long wing 23 and the short wing 24 are provided so as to twist backward in the rotation direction, their twisting directions become opposite to each other.

However, to promote the movement property of the mixing materials, the long wing 23 and the short wing 24 are disposed such that the other end portion of the long wing 23 and the one end portion of the short wing 24 appear alternately while shifting by 450 in the circumference direction.

Figure 4:
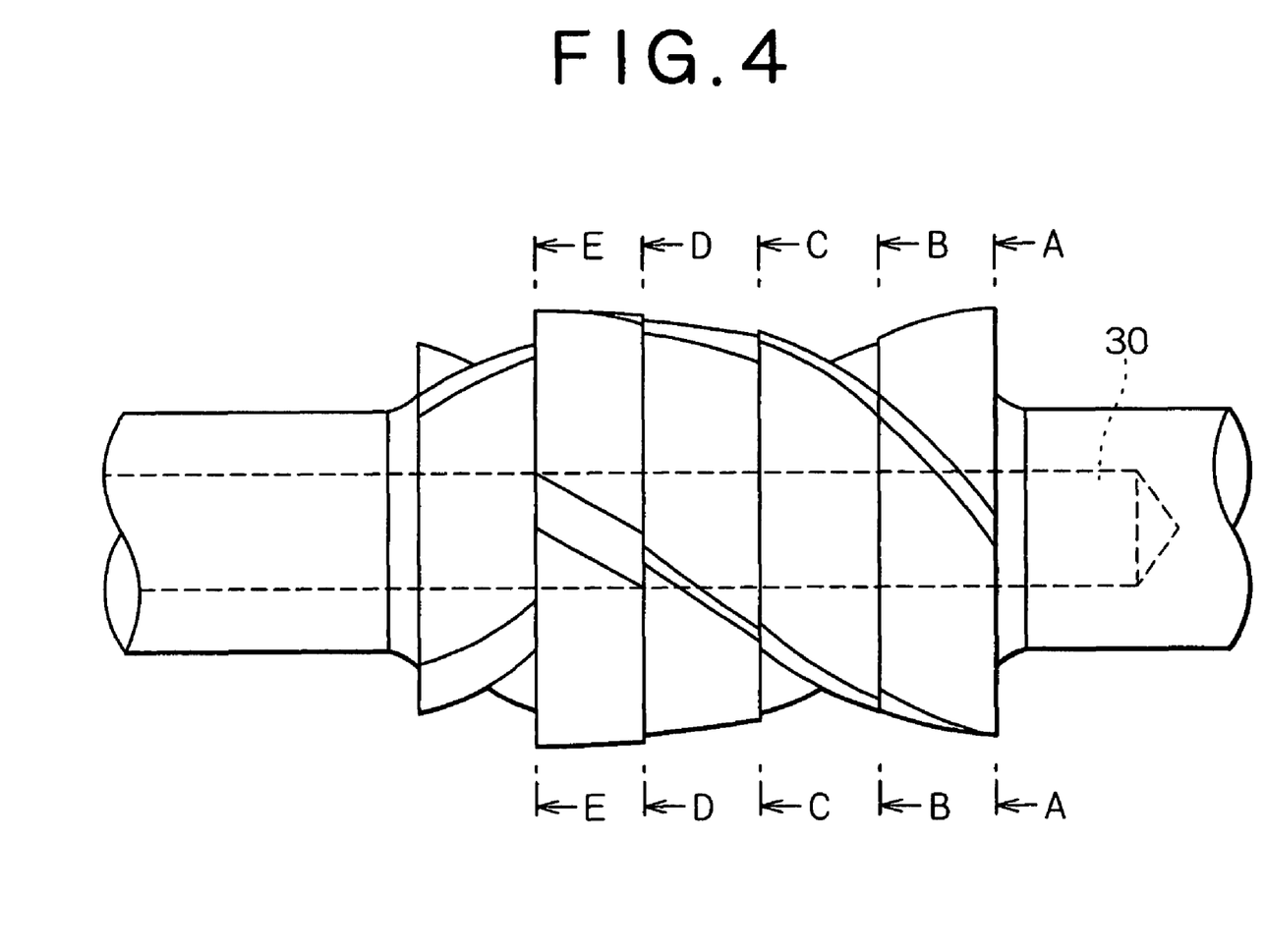
FIG. 4 is a front view of the mixing rotor.

Further, the length of the long wing 23 in the axis direction is four times that of the short wing 24, and the long wing 23 is equally divided into four pieces as shown in FIG. 4.

The above-described long wing 23 is sectionalized into a high tip portion 23S where the tip at the wing top portion is high, a relatively high tip portion 23M, a relatively low tip portion 23L and a low tip portion 23LL, and thus, tip portions of four height types appear in the axis direction. Furthermore, tip portions of four height types appear alternately in the circumference direction of each long wing as well. Then, In the tip portion (23S, 23M, 23L, 23LL), tip clearances being gaps from the inner wall surface of the chamber 2 are set such that they become larger in the order of a small tip clearance, a medium tip clearance, a large tip clearance and a very large tip clearance respectively.

TABLE 1

| | Ratio of tip clearance to the inner diameter of chamber |
|---|---|
| S | 0.005 to 0.025 |
| M | 0.01 to 0.05 |
| L | 0.02 to 0.1 |
| LL | 0.025 to 0.15 |

Specifically, the high tip portion 23S is in close proximity to the inner wall surface of the chamber 2 to have the smallest tip clearance, the tip portion imparts large shearing force to the mixing materials to improve the dispersion efficiency when the mixing rotors 4 rotate, and scrapes off the surface layer of the mixing materials attached to the inner wall surface of the chamber 2 to improve the cooling efficiency to the mixing materials in the chamber 2. Further, the high tip portion 23S moves a major part of the mixing materials located on the forward movement side in the axis direction to promote the movement of the mixing materials in the axis direction.

On the other hand, the low tip portion 23LL is sufficiently remote from the inner wall surface of the chamber 2 to have the largest tip clearance, increases the amount of the mixing materials passing through the tip clearance and improves the mixing efficiency by promoting the movement in the circumference direction when the mixing rotors (4a, 4b) rotate, and imparting of local large shearing force is prevented and excessive temperature increase of the mixing materials is suppressed. Furthermore, the relatively low tip portion 23L and the relatively high tip portion 23M are set to have tip clearances having a size between those of the low tip portion 23LL and the high tip portion 23S, and they are designed to adjust the shearing force of the low tip portion 23LL and the high tip portion 23S to the mixing materials and the movement of the materials.

Further, the short wing 24 arranged at the other end of the long wing 23 is formed so as to have a high tip portion 24S, a relatively high tip portion 24M, a relatively low tip portion 24L and a low tip portion 24LL as shown in FIG. 2. Then, the high tip portion 24S is in close proximity to the inner wall surface of the chamber 2 to have the smallest tip clearance similar to the above-described high tip portion 23S of the long wing 23, and it is intended to impart large shearing force to the mixed product, to scrape off the mixing materials attached to the inner wall surface of the chamber 2, and to promote the movement of the mixing materials in the mixing rotor direction.

Furthermore, the low tip portion 24LL is sufficiently remote from the inner wall surface of the chamber 2 to have the largest tip clearance similar to the above-described low tip portion 23LL of the long wing 23, and by increasing the amount of the mixing materials passing though the tip clearance and promoting the movement of the materials in the circumference direction, the mixing efficiency is promoted and imparting of local large shearing force is prevented to suppress the excessive temperature increase of the mixing materials.

Still further, the relatively low tip portion 24L and the relatively high tip portion 24M are set to have tip clearances having a size between those of the low tip portion 24LL and the high tip portion 24S similar to the above-described tip portions (23M, 23L) of the long wing 23, and they are designed to adjust the shearing force of the low tip portion 24LL and the high tip portion 24S to the mixing materials and the movement of the materials.

Moreover, in the above-described long wing 23, as FIG. 2 shows its development view, the twist angle is changed continuously so as to become gradually smaller from an origin P of the one end portion of the mixing rotor to an end-point Q closer to the center of the mixing rotor, and the development shape from the origin P to the end-point Q is formed in a non-linear twisted curve. Specifically, as shown in FIG. 2, a portion 42 closer to the origin of the long wing 23 has a larger gradient angle than a gradient angle of a virtual straight line A that is formed by connecting the origin P to the end-point Q, and a portion 43 closer to the end-point of the long wing 23 has a smaller gradient angle than the gradient angle of the virtual straight line A.

Therefore, the portion 42 closer to the origin of the long wing 23 has a larger twist angle than the case of a wing having the development shape corresponding to the virtual straight line A, so that a larger material flow 40 than the case of the wing corresponding to the line A can be generated at the portion 42, and the mixing efficiency of the mixing material is further improved. On the other hand, the portion 43 closer to the end-point of the long wing 23 has a smaller twist angle than the case of the wing having the development shape corresponding to the virtual straight line A, so that an amount of materials passing through the tip clearance of the portion 43 closer to the end-point is secured so as to be larger than the case of the wing corresponding to the line A, and the dispersion efficiency of the mixing materials is improved.

Consequently, according to the mixing rotor 4 having the long wing 23 that is formed in the twisted curve, both the mixing performance and the dispersion performance to the mixing materials can be improved compared to the case of the wing having the development shape corresponding to the virtual straight line A that is formed by connecting the origin P to the end-point Q with the shortest distance, and thus proper mixing control where the mixing and the dispersion to the mixing materials are compatible can be performed. Further, according to the above-described mixing rotor 4, since the twist angle at the portion 42 closer to the origin of the long wing 23 at the end in the rotor axis direction is larger than a conventional one, there exists an additional effect that the pressure of the mixing materials to the end of the rotor axis in the chamber 2 is loosened and the sealing performance of a bearing portion between the chamber 2 and the mixing rotors 4 can be improved. In addition, according to the above-described mixing rotor 4, since the twist angle at the center portion in the rotor axis direction of the mixing rotor is smaller than a conventional one, when a block state mixing material such as rubber is taken into the chamber 2, for example, the biting property of the mixing material into the chamber 2 is also improved. Consequently, there also exists an additional effect that time for taking the mixing materials into the chamber can be shortened and the productivity improves.

In the above-described constitution, description will be made for the operation of the batch mixer 1. Firstly, as shown in FIG. 3, by separating the floating weight 7 from the case 3 in the state where the drop door 11 is in close contact with the case 3, the top surface of the chamber 2 is opened. Then, after loading the mixing materials such as rubber, plastic and a packing material from the opening into the chamber 2, the floating weight 7 is closely attached to the case 3 and the materials are pressed into the chamber 2. Before and after pressing the materials into the chamber, a cooling medium such as cooling water is allowed to flow in the cooling medium paths (12, 13) provided inside the case 3 and the mixing rotors 4 to cool down the mixing materials in the chamber 2, as shown in FIG. 3 and FIG. 5. Furthermore, by arranging the pair of mixing rotors (4a, 4b), which are housed in the chamber 2, in the tangential non-intermeshing type, the reduction of effective area associated with the increase of wings is controlled to secure high productivity.

Next, to obtain a mixed product of a desired mixing state by mixing and dispersing each mixing material, the mixing rotors (4a, 4b) are rotated in the opposite direction to each other to start mixing. When the mixing rotors (4a, 4b) start rotation, even when rubber of a block state is loaded as a mixing material in a communicating portion 2c, the mixing materials move to first and second (right and left) mixing rooms (2a, 2b) by biting force because the high tip portion 23S of the long wing 23 and the high tip portion 24S of the short wing 24 are set to small tip clearances. Therefore, it is always possible to flow the mixing materials into every space in the chamber 2 in short time from the start of mixing.

When the mixing materials are mixed in the chamber 2 as they are mixed and dispersed as described above, the tip portions (23S, 23M, 23L, 23LL) of the long wing 23 and the tip portions (24S, 24M, 24L, 24LL) of the short wing 24, which have different twist angles, work to the mixing materials as follows.

Figure 6:
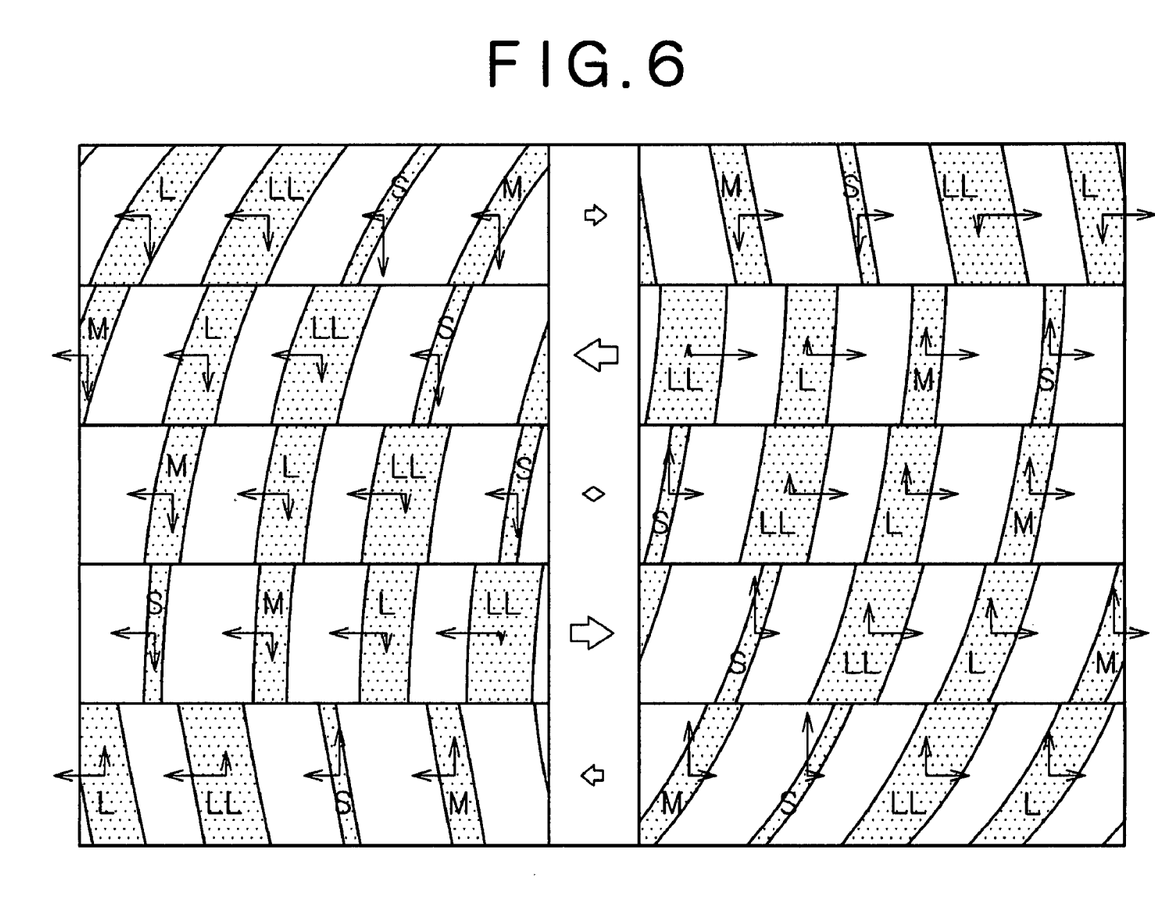
FIG. 6 is an exemplary view showing a flowing state of a mixing material.

Specifically, FIG. 6 is the development view where a hatching portions show the land portions at the wing top of each tip portion of the mixing wings, vectors show the flow amount and the directions of the mixing materials, and outlined arrows schematically show the flow amount and the directions of the mixing materials at the communicating portion 2c that communicates the first and second mixing rooms (2a, 2b).

(Narrow Tip Clearance)

The high tip portion 23S of the long wing 23 and the high tip portion 24S of the short wing 24 are in close proximity to the inner wall surface of the chamber 2 so as to form the smallest tip clearances, the mixing rotors 4 are constituted to allow the high tip portions to appear on any position of the total length in the axis direction of the mixing section 21 when the rotors rotate, and thus large shearing force is evenly imparted to disperse the mixing materials. Further, the high tip portions (23S, 24S) are designed to improve the cooling efficiency to the mixing materials in the chamber 2 having the cooling medium paths 12 by scraping off the surface layer of the mixing materials attached to the inner wall surface of the chamber 2. Moreover, the high tip portions (23S, 24S) are designed to move a major part of the mixing materials located on the forward movement side to an adjacent different tip portion in the axis direction to promote the movement of the mixing materials in the axis direction.

Description will be made for the constitution where the high tip portions appear on any position of the total length in the axis direction of the mixing section 21. The main function of the narrow tip clearances formed by the high tip portions is to scrape materials off a barrel inner surface. The constitution means a structure for scraping off across the total length in the axis direction (entire range in the longitudinal direction of the barrel inner surface) of the mixing section. In FIG. 2, vertical lines dividing into five sections are shown in the horizontal direction of the drawing, where one section at far left is applied to the short wing and the other four sections are applied to the long wing. In any of the five sections, since one "S (high tip portion, narrow tip clearance)" is inevitably provided, "S" appears (passes) in each section without fail when the mixing rotors rotate. Since "S" is provided in all sections, "S" appears over the total length in the axis direction of the mixing section with the rotation of the mixing rotors.

Meanwhile, FIG. 2 shows that four tip clearances of "S, M, L, LL" are used in each section in order to provide tip clearances on four wings in good balance, but they may be "S, S, M, L", for example, to allow "S" to appear twice over the total length in the axis direction of the mixing section with the rotation of the mixing rotors. Alternatively, two "S" may be provided for a section and one "S" may be provided for the other sections. The point is that "S" should only be disposed so as to appear (pass) at least once over the total length in the axis direction of the mixing section when the mixing rotors are turned for one rotation.

Furthermore, when the high tip portion 23S of the long wing 23 and the high tip portion 24S of the short wing 24 pass the communication portion 2c, they push out the mixing materials from one (either the first or the second) mixing room (2a, 2b) to the other (either the second or the first) mixing room (2b, 2a) with large pressing force, so that the movement of the mixing materials between the first and second mixing rooms (2a, 2b) is also promoted.

(Wide Tip Clearance)

On the other hand, the low tip portion 23LL of the long wing 23 and the low tip portion 24LL of the short wing 24 are sufficiently remote from the inner wall surface of the chamber 2 so as to form the largest tip clearances, where they increase the amount of the mixing materials passing though the tip clearances and promote the movement of the materials in the circumference direction when the mixing rotors 4 rotate, and improve the mixing efficiency. Additionally, imparting of local large shearing force is controlled and the excessive temperature increase of the mixing materials is suppressed.

Further, because the tip clearances are wide, even a low-temperature hard material or a material having large grains can easily pass through the tip clearances, and therefore, they promote plasticizing or melting of rubber or plastic being the mixing material.

Still further, since the low tip portion 23LL of the long wing 23 and the low tip portion 24LL of the short wing 24 have small pressing force for pushing out the mixing materials, they control the movement of the materials to the first and second mixing rooms (2a, 2b) on the other side when the materials pass the communicating portion 2c. Thus, they promote only the movement of the mixed product in a same mixing room.

(Medium Tip Clearance)

Furthermore, the relatively low tip portion 23L and the relatively high tip portion 23M of the long wing 23 and the relatively low tip portion 24L and the relatively high tip portion 24M of the short wing 24 are set to have tip clearances having a size between those of the low tip portions (23LL, 24LL) and the high tip portions (23S, 24S) of the long and short wings, and they are designed to adjust the dispersion and the mixing to the mixing materials by the low tip portions (23LL, 24LL) and the high tip portions (23S, 24S) of the long and short wings.

(Twist of Wings)

Moreover, in the above-described long wing 23, as FIG. 2 shows its development view, the twist angle is changed continuously so as to become gradually smaller from the origin P of the one end portion of the mixing rotor to the end-point Q of the other end portion of the mixing rotor, and the development shape from the origin P to the end-point Q is formed in the non-linear twisted curve. Specifically, as shown in FIG. 2, the portion 42 closer to the origin of the long wing 23 has a larger gradient angle than the gradient angle of the virtual straight line A that is formed by connecting the origin P to the end-point Q, and the portion 43 closer to the end-point of the long wing 23 has a smaller gradient angle than the gradient angle of the virtual straight line A.

Therefore, as FIG. 6 shows the flow amount and the direction of the mixing materials, the portion 42 closer to the origin of the long wing 23 has a larger twist angle than the case of the wing having the development shape corresponding to the virtual straight line A, so that the movement of the materials in the rotor axis direction is further promoted than the case of the wing. This improves the mixing efficiency of the mixing materials and the attaching and the accumulation of the mixing materials to the mixing wing surface are prevented. Furthermore, the cooling efficiency by the cooling medium paths 13 provided in the mixing rotors 4 is improved as shown in FIG. 5.

On the other hand, the portion 43 closer to the end-point of the long wing 23 has a smaller twist angle than the case of the wing having the development shape corresponding to the virtual straight line A. Therefore, priority is given more to the biting property of the mixing materials into the chamber 2 and the dispersion efficiency of the mixing materials than the movement promotion of the materials in the rotor axis direction. In addition, since excessive pressure generated by the flow of the mixing materials in the mixing rotor axis direction is loosened, the mixing materials can be prevented from flowing to the shaft sealing section at the other end portion.

As described, the following effects are obtained by using different sizes (wide and narrow) of tip clearances and the mixing wings having different twist angles in the chamber 2 of tangential non-intermeshing type.

Specifically, the reduction of the effective volume of the chamber 2 associated with the increase of wings is prevented, and different sizes of mixing materials can be bitten into the chamber 2 effectively. Further, due to the generation of wide movement property in various directions, the attaching and the accumulation of the mixing materials to the mixing wings do not appear, and higher mixing efficiency and cooling efficiency are realized. Moreover, effective dispersion is promoted while the excessive increase of temperature of the mixing materials is suppressed.

With the above-described synergy effect, the quality reduction of the mixing materials caused by the heat generation is prevented, and the number of wings is increased to improve the productivity without diminishing the inherent processing performance of the mixer.

When mixing is performed for a predetermined period of time in the chamber 2 and a mixed product of a desired mixing state is obtained as described above, the mixed product is discharged to the outside of the apparatus by opening the drop door 11.

Meanwhile, two mixing rotors are applied to the batch mixer so as to be housed in the chamber in the tangential non-intermeshing state. However, the mixing rotor according to the present invention is not limited to this, and the two mixing rotors may be applied to the batch mixer such that the wing tops of the mixing wings are intermeshed in the chamber, that is, they are housed in a partially intermeshing state, for example. It is to be noted that the invention is not applied for a batch mixer that houses the two mixing rotors in a completely intermeshing state in the chamber.

Further, four pieces of long wings and four pieces of short wings, which are disposed in equal distance at four positions in the circumference direction, are allowed to appear in this embodiment, the arrangement and the number of the long wings 23 and the short wings 24, the length in the axis direction of the wing portion, and the like can be selected arbitrarily as long as three or more of the long and short wings appear in the circumference direction.

In this embodiment, the twist angle of the short wing is set to a fixed value, but the twist angle of the short wing may be changed from the origin toward the end-point. Thus, with the promotion of the movement of the materials in the axis direction at the origin of the short wing, the mixing efficiency is improved and the accumulation is controlled, and the pressure of the mixing materials applied to the shaft sealing section can be reduced.

Furthermore, different sizes of tip clearances with the same number as the number of wings are allowed to appear in the axis direction of the long wings, and different sizes of tip clearances are also allowed to appear in each wing in the circumference directions of the long wings corresponding to the tip clearances in the axis direction. Moreover, different sizes of tip clearances with the same numbers as the number of the short wings are allowed to appear in the circumference direction.

However, as long as a narrow tip clearance and one or more of wider tip clearances are allowed to appear in the axis direction of the long wings, and the short wings have a narrow tip clearance and one or more of wider tip clearances at least in the circumference direction in a mixed manner, and the long and short wings are disposed such that the narrow tip clearance of the long wings and the narrow tip clearance of the short wings pass at least once over the total length in the axis direction of the mixing portion when the mixing rotor is turned for one rotation, the number, the arrangement and the like of the tip clearances can be arbitrarily selected.

Further, in this embodiment, a cooling medium is allowed to flow in the cooling medium paths provided in the case and the mixing rotors in order to cool down the mixing materials in the chamber, but a heating medium such as hot water and vapor may be allowed to flow in the cooling medium paths in order to heat the mixing materials depending on the composition and the type of the mixing materials. Specifically, in the case of a hard mixing material, it may be heated by using the heating medium when mixing begins and the medium may be switched to the cooling medium later to perform cooling.

Still further, as the means for cooling down the mixing materials, it is not limited to the above-described structure where the cooling medium is allowed to flow in the cooling medium paths, but various structures such as a structure where a cooling jacket is attached around the chamber may be applied.

Meanwhile, as shown in FIG. 1 and FIG. 5, the rotors in this embodiment employ a so-called divided segment type where the entire wing portion is equally divided, but the width of each divided segment may be even or uneven. Alternatively, the rotors may be manufactured by one-piece casting or machining, and they can be freely designed within the scope without departing from the technical concept of the present invention.

What is claimed is:

1. A batch mixer, comprising:
   a case having a chamber for mixing therein;
   a pair of mixing rotors rotating in the opposite direction to each other, the pair of mixing rotors being in a non-intermeshing state; and
   a cooling structure for cooling down the inner surface of said chamber, wherein each of said pair of mixing rotors has a mixing section and comprises:
   a long wing that has an origin at one end portion of said mixing section and extends further than the center of said mixing section in the rotation axis direction of said mixing rotor so as to twist backward in the rotation direction of said mixing rotor, four or more of said long wings being disposed in the circumference direction of said mixing rotor; and
   a short wing that has an origin at the other end portion of said mixing section and extends to a position before the center of said mixing section in the rotation axis direction of said mixing rotor so as to twist backward in the rotation direction of said mixing rotor, four or more of said short wings being disposed in the circumference direction of said mixing rotor,
   wherein a narrow tip clearance and one or more of wider tip clearances are allowed to appear in the axis direction of the four or more of said long wings, a twist angle at the one end portion of the four or more of said long wings is 30° to 65°, the four or more of said long wings are formed in a twisted curve whose twist angle becomes smaller as it draws apart from the one end portion, the four or more of said short wings have a narrow clearance and one or more of wider clearances at least in the circumference direction in a mixed manner, and said long and short wings are disposed such that said narrow tip clearances pass for at least one time over the total length in the axis direction of said mixing section by the narrow tip clearance of said long wing and the narrow tip clearance of said short wing, when said mixing rotor is turned for one rotation,
   wherein the twist angle of the tip of said long wings that draw apart from the one end portion is 10° to 55°, and a twist angle at the other end portion of said short wings is 20° to 45° and is formed smaller than the twist angle of said long wings at the one end portion.

2. The batch mixer according to claim 1, wherein the ratio of said narrow tip clearances to a chamber inner diameter is 0.005 to 0.025, and the ratio of said wide tip clearances is at least one of 0.01 to 0.05, 0.02 to 0.1, and 0.025 to 0.15.

3. The batch mixer according to claim 2, wherein said long wings are four or five pieces and include tip clearances having a ratio to said chamber inner diameter of 0.005 to 0.025, 0.01 to 0.05, 0.02 to 0.1, and 0.025 to 0.15 in the axis direction of each long wing, and said short wings are four or five pieces and each short wing in the circumference direction includes a tip clearance having the ratio to said chamber inner diameter at 0.005 to 0.025, 0.01 to 0.05, 0.02 to 0.1, and 0.025 to 0.15.

4. The batch mixer according to claim 3, wherein the numbers of said long wings and said short wings are the same, tip clearances of the same number as the number of said long wings are allowed to appear on each long wing, different tip clearances corresponding to the tip clearances in said axis direction are also allowed to appear on each wing in the circumference direction of said long wings, and different tip clearances of the same number as the number of said short wings are allowed to appear on each wing in the circumference direction.

5. The batch mixer according to claim 3, wherein said mixing rotors have paths for flowing a cooling medium in the inside of the rotors.

6. The batch mixer according to claim 5, wherein the cross section of said cooling medium paths is formed in a similar shape to the cross section of said mixing rotor.

7. A mixing rotor having a mixing section, said rotor comprising:
a long wing that has an origin at one end portion of said mixing section and extends further than the center of said mixing section in the rotation axis direction so as to twist backward in the rotation direction of said mixing rotor, four or more of said long wings being disposed in the circumference direction of said mixing rotor; and
a short wing that has an origin at the other end portion of said mixing section and extends to a position before the center of said mixing section in the rotation axis direction so as to twist backward in the rotation direction of said mixing rotor, four or more of said short wings being disposed in the circumference direction of said mixing rotor,
wherein a high tip portion and one or more of lower tip portions are provided in the axis direction and the circumference direction of each of the four or more of said long wings, the four or more of said long wings are formed in a twisted curve whose twist angle becomes smaller as it draws apart from one end portion, and the four or more of said short wings have a high tip portion and one or more of lower tip portions in a mixed manner at least in the circumference direction of said short wings,
wherein the twist angle of the tip of said long wings that draw apart from the one end portion is 10° to 55°, and a twist angle at the other end portion of said short wings is 20° to 45° and is formed smaller than the twist angle of said long wings at the one end portion.

8. The mixing rotor according to claim 7, wherein said long and short wings are disposed such that, when said rotor is turned for one rotation, the high tip portions pass over the total length in the axis direction of said mixing section due to the presence of the high tip portion of said long wing and the high tip portion of said short wing.

9. The mixing rotor according to claim 8, wherein said short wings are four or five pieces.

10. The mixing rotor according to claim 9, wherein said mixing rotor has paths for flowing a cooling medium in the inside.

11. The mixing rotor according to claim 10, wherein the cross section of said cooling medium paths is formed in a similar shape to the cross section of said mixing rotor.

* * * * *